UNITED STATES PATENT OFFICE.

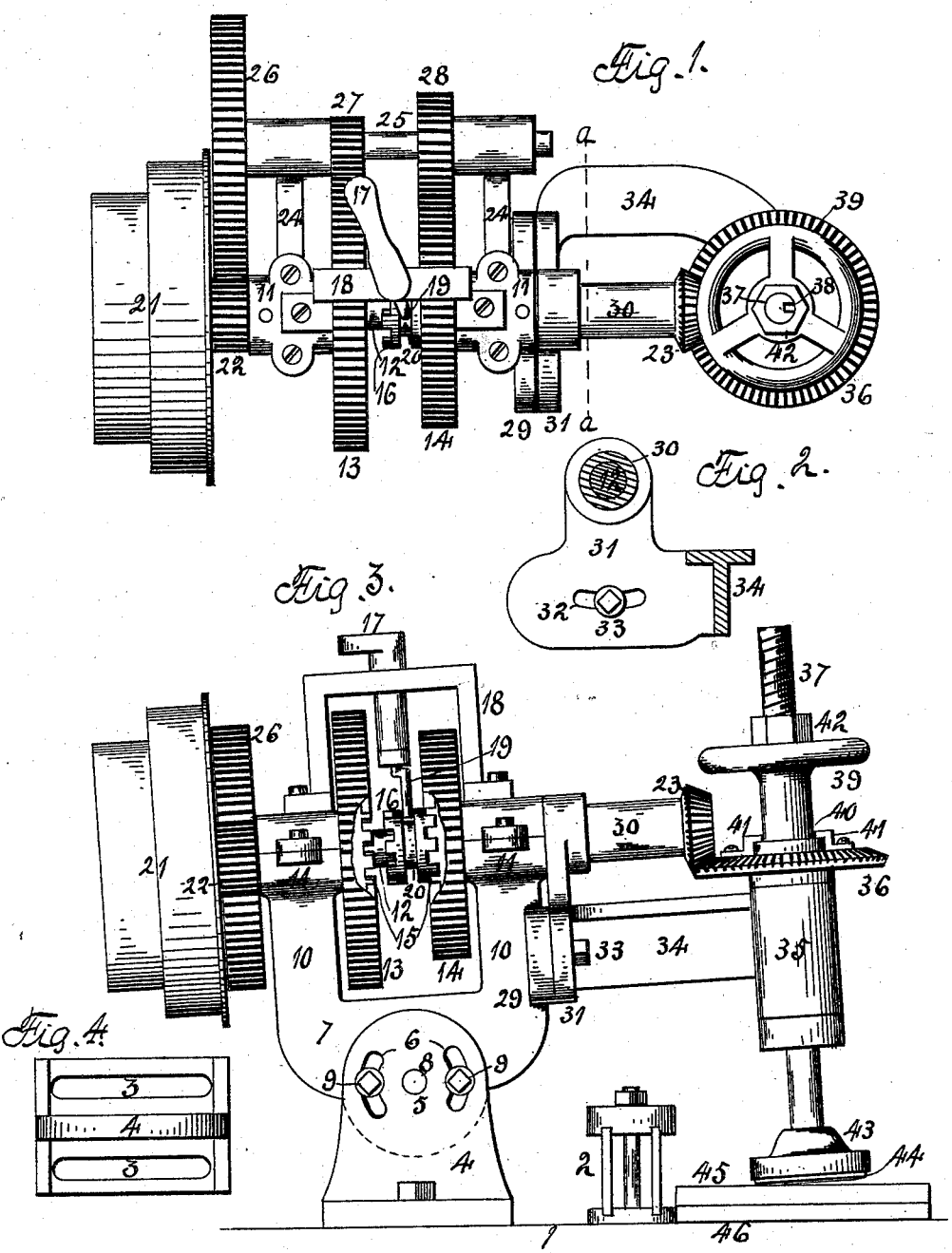

CHRISTIAN BECKER AND EDWARD C. KELONGE, OF BELOIT, WISCONSIN.

SHAPING-MACHINE.

SPECIFICATION forming part of Letters Patent No. 647,464, dated April 17, 1900.

Application filed August 31, 1899. Serial No. 729,085. (No model.)

*To all whom it may concern:*

Be it known that we, CHRISTIAN BECKER and EDWARD C. KELONGE, citizens of the United States, residing at Beloit, in the county of Rock and State of Wisconsin, have invented certain new and useful Improvements in Shaping-Machines, of which the following is a specification.

The object of this invention is to construct a feeding device for woodworking-machines, which is especially adapted for shaping-machines in which a disk stands at an angle to the material to be fed, so that a portion only of its face is in contact and a rotary movement is imparted to the disk.

In the accompanying drawings, Figure 1 is a plan view of our improved feeder. Fig. 2 is a vertical transverse section on dotted line *a*, Fig. 1. Fig. 3 is a side elevation. Fig. 4 is a plan view of the base-plate.

The feeder is adapted to be attached to the table 1 of a shaping-machine supporting a rotating knife-head 2.

The base-plate of the feeder has two slots 3 and a vertical section 4, having a central opening 5 and two concentric slots 6. A frame 7 has a pivot 8 located in the opening 5, and two screw-threaded bolts 9 pass through the concentric slots 6 into the frame, thereby forming an adjustable connection between the frame and base-plate. This frame has two vertical arms 10, their upper ends 11 in box form. A shaft 12 is supported in the boxes 11, and upon this shaft between the boxes are loosely mounted two spur-toothed wheels 13 and 14, their inner faces 15 made in clutch form. Upon the shaft 12, between the wheels 13 and 14, is located a double-faced clutch 16, having a sliding engagement with the shaft. A shipping-arm 17 is supported by an arch 18, secured to the boxes 11, and supports a crank-arm 19, adapted to enter the groove 20 of the clutch, by means of which the clutch can be moved into engagement with the clutches of the toothed wheels 13 and 14, so that the movement of the wheels will be imparted to the shaft.

The shaft 12 projects beyond the boxes 11, and upon one end is loosely mounted a cone-pulley 21 and pinion 22. The pulley and pinion are connected to revolve together. The other end of the shaft supports a bevel-toothed pinion 23 and revolves therewith. From the frame 7 extend two arms 24, each having its ends in box form and supporting a shaft 25 in a manner to revolve. This shaft 25 has secured thereto a toothed wheel 26 and pinions 27 and 28. The toothed wheel 26 meshes with the pinion 22, the pinion 27 with the toothed wheel 13, and the pinion 28 with the toothed wheel 14, so that a rotary motion imparted to the cone-pulley will be imparted to the toothed wheels 13 and 14, and owing to their different diameters they will revolve at different speeds.

The frame 7 supports a plate 29 and a tubular extension 30, through which shaft 12 passes. Upon this tubular extension is located a bracket 31, having a curved slot 32, through which a screw-bolt 33 passes into the plate 29, thereby forming an adjustable connection between the plate and bracket.

From the bracket extends an arm 34, its free end supporting a tubular portion 35. A beveled toothed wheel 36 is supported by the tubular portion 35 in a manner to permit it to revolve and meshes with the bevel-toothed pinion 23, from which it receives its rotary movement. A shaft 37 has a lengthwise groove 38 and a feather connection with the bevel-toothed wheel 36 in order that a rotary movement may be imparted to the shaft by the wheel and that the shaft can have a lengthwise adjustment. A hand-wheel 39 has a screw-threaded connection with the shaft 37 and has a flange 40, over which clamps 41, secured to the wheel 36, rest, and a jam-nut 42 has a screw-threaded connection with the shaft 37 and adapted to lock the shaft and hand-wheel together. The lower end of the shaft 37 supports a disk 43, having a rubber face 44.

The feeder is secured to the table of a shaping-machine, and by means of the slots 3 in the base the proper adjustment can be had with respect to the rotating cutter-head 2.

By means of the adjustable connection between the base and frame 7 the shaft 37 is adjusted to present a portion of the face of the disk 43 in contact with the material to be fed, and by means of the hand-wheel the proper pressure can be given to the disk by adjusting the shaft lengthwise.

By the adjustable connection between the bracket 31 and plate 29 the tubular support 35 can be moved so as to create a drawing action of the disk 43 in contact with the material to be fed.

The material 45 to be fed is secured to a pattern 46, and if the work be straight cutting the disk 43 is adjusted so that in rotating it will exert a slight pressure toward the cutter-head 2, and if the work to be cut is of irregular shape then a greater force is exerted toward the cutter-head, and when once adjusted the piece of material will be fed automatically.

By reference to the "face" of the feeding-disk we mean the flat surface and not the periphery.

We claim as our invention—

1. A feeding device for woodworking-machines, consisting of a rotating shaft supporting a disk, and so located with respect to the material to be fed that a portion only of the face of the disk rotates in contact therewith.

2. A feeding device for woodworking-machines, consisting of a disk, so located with respect to the material to be fed that a portion only of its face rotates in contact therewith, and means for adjusting the pressure of the disk upon the material.

3. A feeding device for woodworking-machines, consisting of a disk, so located with respect to the material to be fed that a portion only of its face rotates in contact therewith and means for adjusting the angles at which the disk is presented to the material.

4. A feeding device for woodworking-machines, consisting of a disk, so located with respect to the material to be fed that a portion only of its face rotates in contact therewith, and means for adjusting the feeding device bodily.

CHRISTIAN BECKER.
EDWARD C. KELONGE.

Witnesses:
F. F. LIVERMORE,
J. R. BOOTH.